Sheet 1, 2 Sheets.
S. H. Long.
Truss Bridge.
No. 34. Reissued Jul. 20, 1841.
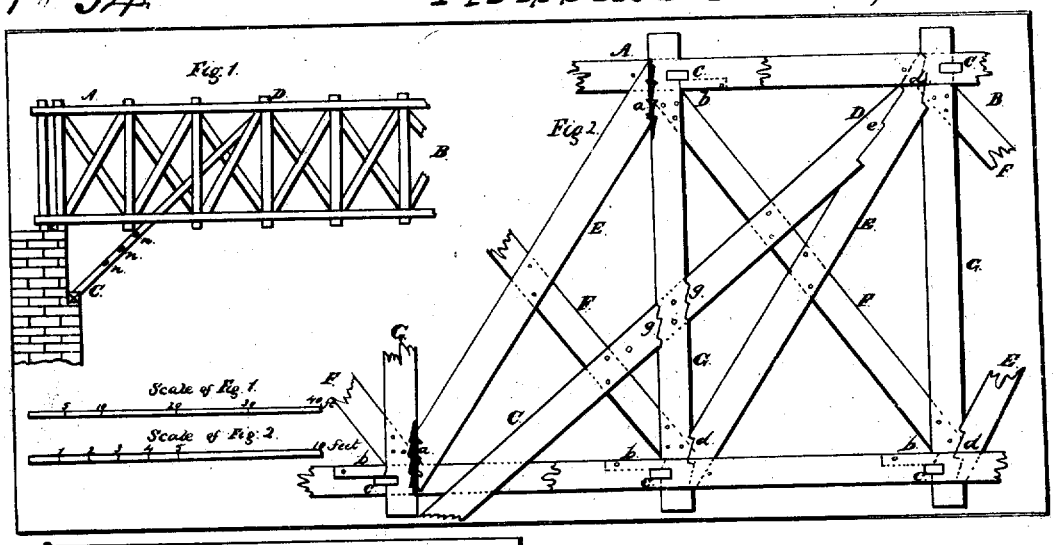
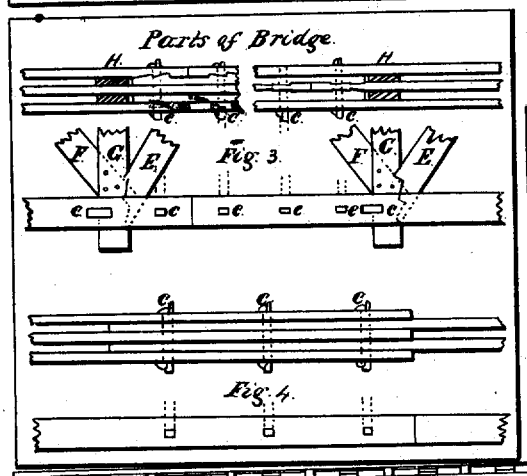
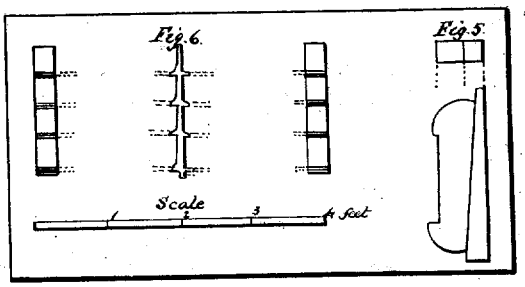
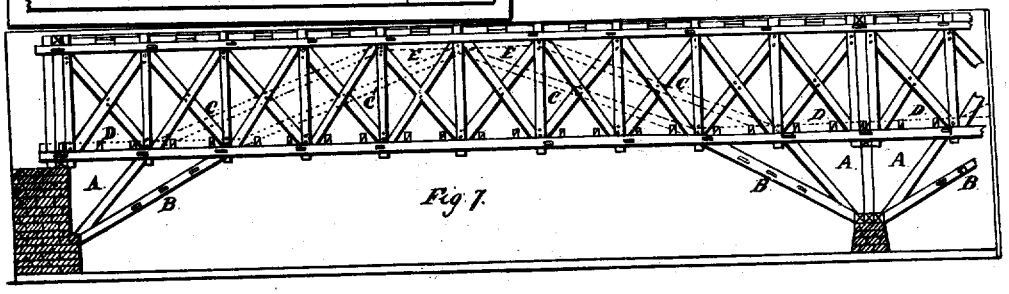
N. PETERS, PHOTO-LITHOGRAPHER, WASHINGTON, D. C.

Sheet 2, 2 Sheets.
S. H. Long.
Truss Bridge.
No. 34. Reissued Jul. 20, 1841
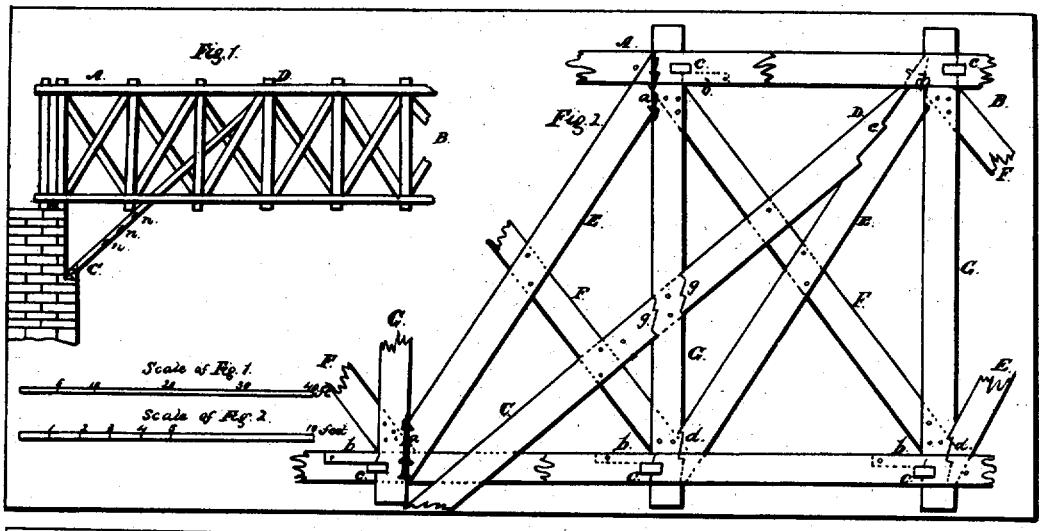
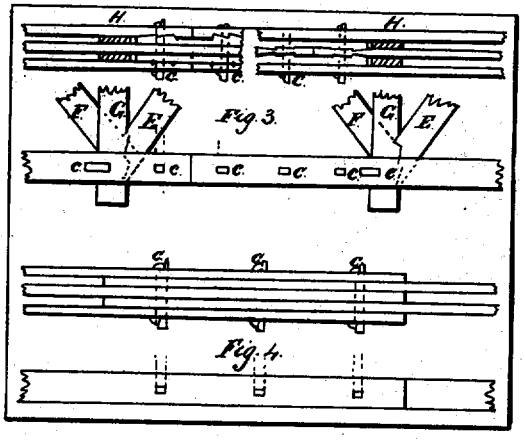
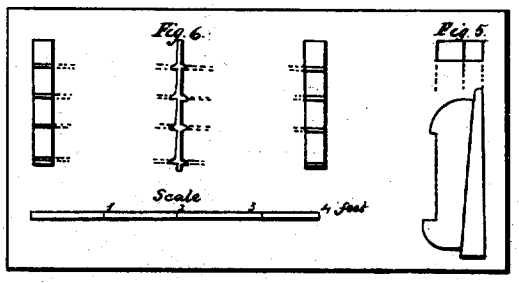
N. PETERS, PHOTO-LITHOGRAPHER, WASHINGTON, D. C.

UNITED STATES PATENT OFFICE.

STEPHEN H. LONG, OF MARIETTA, GEORGIA.

IMPROVEMENT IN WOODEN-FRAME BRACE-BRIDGES.

Specification forming part of Letters Patent No. 1,398, dated November 7, 1839; Reissue No. 34, dated July 20, 1841.

*To all whom it may concern:*

Be it known that I, STEPHEN H. LONG, of the United States engineers, have invented certain Improvements in the Construction of Wooden or Frame Bridges, the objects of which are greater simplicity, economy, and efficiency in the mode of bridge-building, and in the arrangement of the parts of bridges, than have hitherto been attained by any combination of principles or arrangement of parts heretofore adopted in structures of this nature.

The several parts of the bridge to which said improvements relate are the strings and their splices, the posts, the main braces, the counter-braces, and the arch-braces of a truss-frame, and also the manner of trussing or straining the truss-frames.

The several parts above enumerated have the same relation to the bridge, and are intended to impart a similar efficiency in sustaining it, as those designated by the same names in the several patents obtained by me for wooden or frame bridges, and to which reference may be had. These parts, however, in the structure herein described, vary materially in their relative and especially in the transverse dimensions of the timber used from those contemplated and described in the patents above cited.

Instead of timbers of various sizes and of nearly a square form, the several parts alluded to are to be uniform, or nearly so, in all their transverse dimensions, a transverse section of each timber of all the parts having the form of a parallelogram, varying from two to four inches by eight to twelve or fifteen inches, according to the length of the bridge-span, the weight of the load to be sustained upon the bridge, and other circumstances connected with these considerations.

Instead of notches or recesses in the string-pieces and posts, by means of which these parts are locked together, and instead of wedges at the insertions of the posts between the string-pieces, the connections between the posts and strings are effected by means of gibs and keys passing entirely through the strings transversely thereof, and at the same time resting in notches prepared for the reception of the gib and key in the back of the post, or in the side opposite to the points or steps at which the main braces communicate their thrust against the posts, the notches serving to regulate and maintain the relations, with respect to distance, between the upper and lower strings, the gibs serving to clamp the string-pieces together, and the keys serving not only to confine the strings to the posts, but also to impart the requisite trussing to the truss-frame, and at the same time to force the counter-braces into appropriate action. Coggles or pieces of timber about two feet long, three inches thick, and three or four inches wide are inserted in the spaces between the string-pieces and immediately behind the posts, for the purpose of aiding the gibs and keys in counteracting the thrust of the main braces. The coggles are applied subsequently to the adjustments effected by trussing, being confined at one end by appropriate notches in the posts for their reception, and at the other by treenails passing through them and the string-pieces. The main braces are connected to the posts by means of notches or steps in the latter, adapted to the reception of tuscums at the ends of the former. Instead of tuscums and steps, as described in the preceding paragraph, steps of cast-iron, with appropriate lugs or bearings on opposite sides of each step, adapted to suitable receptacles for the same in the posts and braces, as represented in the accompanying drawings, may be substituted for the purpose of receiving and resisting the action to which these parts are subjected. The counter-braces occupy the entire distance between the upper and lower strings diagonally of each panel of the truss-frame, and are confined between the posts by treenails passing through them and the posts near the strings. They may also be confined to the main braces by treenails passing through them at the intersections of the former with the latter. The counter-braces are brought into their appropriate action by straining upon the gibs and keys of the strings, in the manner before explained. The arch-braces rise in three or more pieces from a bench or bolster attached to the abutment or pier below the bridge, pass through the lower string in two or more pieces within the openings or interstices occasioned by the posts and main braces, enter the first, second, or third panel of the truss-frame, counting from each end of the bridge-span, and thrust against the furthermost posts of the panel entered, being intercepted by these posts, against which the thrust of the arch-braces is communicated in part by means of appropriate notches in the former and corresponding tuscums in the latter. The action of the arch-brace is continued past the posts by similar pieces and connections within the next panel, and by the aid of a splicing-piece situated between the posts and extending from the counter-brace of the panel first entered to that of the panel beyond, and occupying the space between the side pieces of the arch-brace. Thus continued, the arch-brace extends to the head of the next main braces, and is connected with them near the upper string by means of corresponding tuscums and notches. In order to render the action of the arch-brace more certain and efficent, another splicing-piece is inserted, extending from the counter-brace last mentioned to the head of the next counter-brace, and occupying, as before, the space between the cheeks or side pieces of the arch-brace. The several parts of the arch-brace situated within the truss-frame, as also the posts and main braces at the crossings or intersections of the arch-braces, are firmly united by treenails passing entirely through the several pieces of which they are composed. The interior portions of the arch-braces situated beneath truss-frames are respectively furnished with a series of gibs and keys, which serve not only to confine together the pieces of which they are composed, but also to render the arch-braces extensible, or the reverse, as may be found necessary, either to give appropriate action to the arch-brace or to increase or diminish the camber of the bridge.

In addition to the inferior portions of the arch-braces above named, I also sometimes employ what I denominate "side arch-braces," and these rise from the lower string-pieces at or near the first, second, or third set of posts from each abutment or pier, and extend obliquely upward, embracing each of the sides of the truss-frame to the upper string crossing one, two, or more panels, as may be deemed most expedient. The head of each side arch-brace is to thrust firmly against a plate of the same transverse dimensions, situated immediately below and parallel to the upper string. The foot of each side arch-brace is to thrust against a sill of similar transverse dimensions resting edgewise on the lower strings and extending through a distance of one or more panels of the bridge. The side arch-brace plates and sills must be firmly connected with the truss-frame by means of bolts, clamps, treenails, or other device passing through them and through the posts and main braces at their several crossings. At all junctions, either of the brace with the plate or with the sill, and at all intermediate joints, a thin plate or sheet of iron should be inserted, in order to prevent the fibers or grain of one timber from penetrating between those of the other. The splicings of the outside string-pieces are effected by means of wooden splicing-pieces with appropriate notches and corresponding tuscums, or with coggles of iron or wood situated in appropriate notches prepared for their reception in the splicing-piece and string-piece, and may be clamped together by gibs and keys, or by screw-bolts passing entirely through the strings. The central string-piece may also be spliced in a similar manner, or by means of treenails of wood passing entirely through the strings, no other clampings being required in this case. The lateral bracing is effected by means of locked lattice-work banded by rib-bands on both sides of each truss-frame of the bridge, both above and below the lateral braces. The rib-bands are confined to the lateral braces by treenails passing entirely through them and the braces at every intersection of the former with the latter.

The accompanying drawings will serve to illustrate and make known the manner in which I construct the respective parts of my brace-bridge and carry my improvements into operation.

In Figure 1, A B C D represent a side view of part of a truss-frame, C D being the arch-brace, with its lower end, C, resting on a bench or bolster on the abutment or pier below the bridge, *n n n* showing the situation of the gibs and keys by which the respective thicknesses of timber of which the arch-brace consists are confined together.

In Fig. 2, A B C D are an enlarged view of a part of such frame, drawn to a scale sufficiently large to exhibit the mode of connecting the respective parts thereof. C D are the arch-brace. E E are the main braces, F F the counter-braces, and G G the posts. The timbers constituting the arch-brace are connected at *g g* with the posts G by means of tuscums and notches, and with one of the main braces E by similar means, as shown at *e*. The main braces E E are likewise connected with the posts G G, both above and below, by like means. The posts G G extend a few inches above the upper and below the lower strings. These strings consist each of three thicknesses of stuff, as shown at H, Fig. 3. The posts G G and the main braces E E are each of them double, and their ends are received into the spaces between the center and the two outer string-pieces. The counter-braces F F are single and abut against the center string-pieces both above and below. They are treenailed at each end to the posts G G, and also to the main braces where they pass between them. The space between the two pieces of timber which constitute the arch-brace C D, I usually fill up by inserting what I denominate "splicing-timber," and connect the whole together by passing treenails through them.

It has been mentioned above that *n n n* in Fig. 1 show the situation of the gibs and keys by which the respective timbers composing the arch-brace are connected together. Such gibs and keys are also employed for the same purpose in various other parts of the structure. Thus, for example, they are employed in mortises through the timbers, (shown at *c c c c*, Fig. 2.) The manner of constructing these gibs and keys, and of inserting and fixing them so as to confine the timbers together, will be manifest upon reference to Fig. 5, where they are represented on an enlarged scale. They are also shown as passing through the string-pieces in Fig. 2 and through the arch-braces in Fig. 4. Between the string-pieces, and immediately behind and in contact with the posts, I insert coggles or blocks of timber, (represented by *b b b*, Fig. 2,) which I fasten in place by treenails. These are for the purpose of sustaining the posts and preventing their yielding or splitting at the gib-notches. The mortises *c c c* (shown on the upper and lower string-pieces in Fig. 2) intersect the posts in those parts, and the posts are necessarily notched out to allow the gibs and keys to pass on their sides opposite to the main braces. These notches in the posts serve, as above remarked, to maintain a relative distance between the upper and lower string-pieces, to clamp and confine them together, and to impart the requisite power of trussing to the truss-frame.

Fig. 3 exhibits different views of a portion of the string-pieces, showing the manner of splicing them, and also the relative positions of the string-pieces, posts, and braces as they project into and are connected with each other. These representations apply equally to the upper and the lower portions of the truss-frame.

Fig. 4 represents a portion of the arch-brace with the manner of applying the gibs and keys thereto, by which it may be extended or contracted at pleasure, the several mortises for the gibs and keys being at equal distances from each other. From this arrangement the camber of the truss-frames may be increased or diminished, as may be required. The center and the two outer pieces of the five thicknesses (represented as clamped together in Fig. 4) are those which rest upon the bench or bolster of the abutment or pier. The other two pieces are those which pass up into the truss-frame.

Instead of the notches and tuscums formed in the timber for connecting the main braces and the posts, I sometimes employ steps or bearings of cast-iron, which are furnished with lugs or tuscums projecting out from each of their sides, and entering corresponding notches made in the posts and braces. These are shown in place at *a a*, Fig. 2, and separately on an enlarged scale at Fig. 6.

Similar steps or pieces of cast-iron may be employed for splicing and uniting the string-pieces, being substituted for the intermediate notched splicing-pieces of wood, (represented as used at H H, Fig. 3.)

Fig. 7 represents the truss-frame of my brace-bridge with the side arch-braces combined with the other parts thereof. In this figure I have shown two inferior arch-braces, A and B; and I have also shown a double set of side arch-braces, this part being represented in dotted lines. The outer braces are marked C C, and the inner ones C′ C′. The outer braces have their thrust at their upper ends against the plate E E, and the foot of each against the additional sill-piece D D. The second or inner pair of side arch-braces, C′ C′, are shown as abutting against each other at their upper ends, and at their lower ends against the piece D D.

Having thus fully described the manner in which I construct my brace-bridge and connect the respective parts thereof together, what I claim as new therein, and desire to secure by Letters Patent, is the following—that is to say:

1. The forming of the truss-frames of bridges by connecting and combining string-pieces, posts, main and counter braces, and arch-braces, by the aid of gibs and keys constructed as set forth, using therewith such bolts or treenails as I may deem proper, but not intending to claim the use of bolts and treenails as making any part of my invention.

2. The employment or use of the gibs and keys formed in the manner set forth, and passing through the string-pieces and into the posts near their ends, for the purpose of trussing and straining the frame generally.

3. The manner of arranging the arch-braces so as to diminish or to increase the camber of the truss-frames by the employment of gibs and keys passing through those portions thereof which constitute the lower parts of said arch-braces.

4. The construction and employment of a bearing or step of cast-iron, furnished with lugs or tuscums which are let into corresponding notches in the head and foot of the main braces and the posts, in the manner and for the purpose set forth.

5. The combining with the truss-frames, constructed as herein set forth, the side arch-braces embracing between them the respective posts and braces over which they pass, and connected therewith, as herein shown and fully made known.

STEPHEN H. LONG.

Witnesses:
THOS. P. JONES,
CLEMT. T. COOTE.